United States Patent [19]

Rink et al.

[11] Patent Number: 4,925,265
[45] Date of Patent: May 15, 1990

[54] APPARATUS FOR DIRECTING A LASER BEAM INTO OPTICAL FIBERS

[75] Inventors: John L. Rink, San Francisco; Dan L. Rink, Oakland; Garrett Lee, Piedmont, all of Calif.

[73] Assignee: Xintec Corporation, Oakland, Calif.

[21] Appl. No.: 180,950

[22] Filed: Apr. 11, 1988

[51] Int. Cl.⁵ .............................................. G02B 6/32
[52] U.S. Cl. ................................................. 350/96.18
[58] Field of Search ................. 350/96.18, 96.20, 96.22

[56] References Cited

U.S. PATENT DOCUMENTS 4,626,066 12/1986 Levinson ........................ 350/96.18
4,705,349 11/1987 Reedy ............................. 350/96.18

Primary Examiner—William L. Sikes
Assistant Examiner—Robert E. Wise
Attorney, Agent, or Firm—Harris Zimmerman; Howard Cohen

[57] ABSTRACT

An apparatus for selectively directing a laser beam into a plurality of optical fibers and for selectively shifting the laser beam among the fibers includes a connector member having a plurality of passages extending longitudinally therethrough, the passages being disposed in a nominal common plane. The input end of each optical fiber extends through a respective passage, with the axes of the input ends spaced closely together and oriented parallel to the axis of a laser beam directed toward the input ends. The laser beam passes through a positive lens having a focal plane coincident with the input ends of the optical fibers. An axially translatable shaft extends generally perpendicular to the nominal plane and to the beam axis, and is coupled to drive means to shift the axial position of the shaft selectively, rapidly, and reiteratively. A plurality of transparent, planar refracting panels are secured to the shaft in close axial spacing, the refracting panels oriented at differing tangential angles with respect to the shaft and disposed to be translated through the beam axis as the shaft translates to refract the laser beam parallel to the beam axis and offset therefrom sufficiently to direct the beam into an input end of a selected optical fiber.

14 Claims, 1 Drawing Sheet

U.S. Patent     May 15, 1990     4,925,265
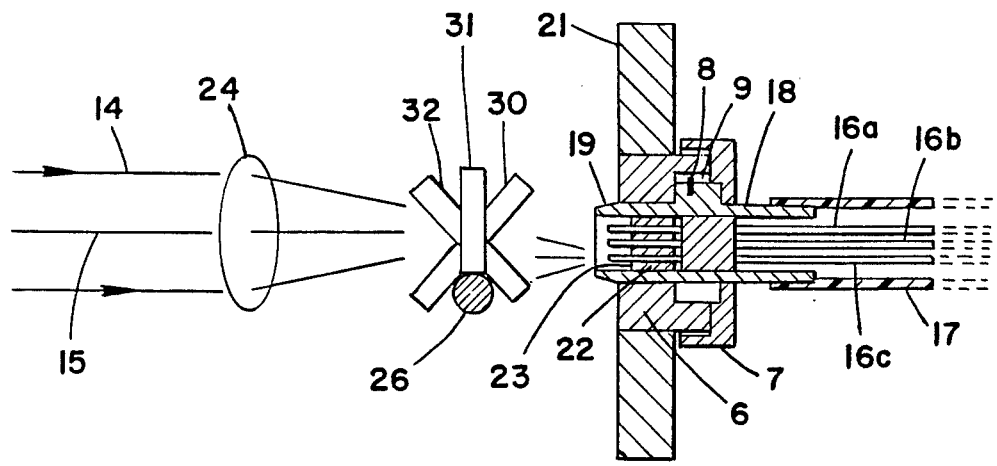
FIG_1
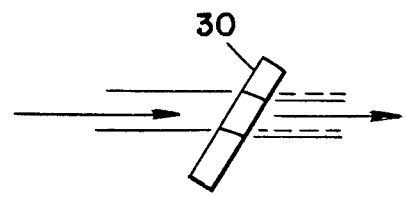
FIG_3
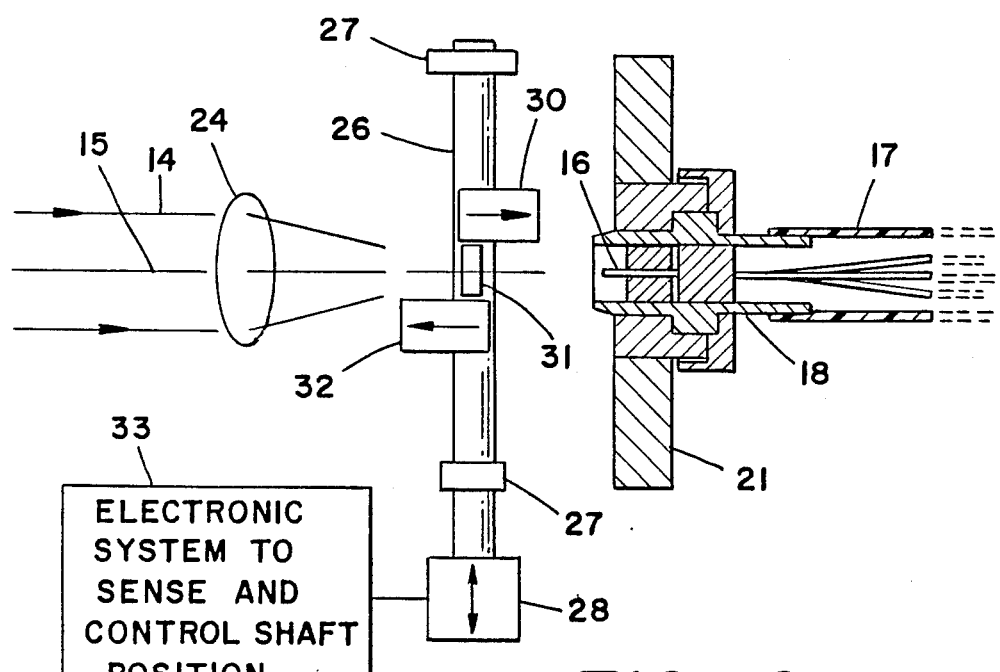
FIG_2

APPARATUS FOR DIRECTING A LASER BEAM INTO OPTICAL FIBERS

BACKGROUND OF THE INVENTION

There are known in the prior art many forms of laser surgical and laser cautery devices which utilize the energy of a laser conducted through an optical or similar optical conduit to the side where it will be utilized for its intended purposes. As such instruments have become increasingly complex and miniaturized, it has become more difficult to deliver the laser beam energy into the optical fiber. And, as the laser devices have become more powerful, it has become apparent that misalignment of the laser and misdirection of the laser beam can have disastrous consequences for the surgical or cautery device.

Recently, surgical and cauterization devices have been developed which employ a plurality of optical fibers to deliver laser energy to an internal site, thus providing greater selectivity and control of the surgical or cauterization procedure. Considering the high cost of a medical laser, it is most economical to employ one laser, and shift the laser beam output selectively to the optical fibers to achieve the treatment effect that is desired. In modern optical fiber assemblies, the fiber itself may be only 100 microns or smaller. It is clear that the laser beam must be steered into the optical fibers accurately and reiteratively; a beam that is focused to a 100 micron spot is likely to cause damage or destruction to adjacent structures if it misses the intended optical fiber target end. Furthermore, the laser energy must be steered to the individual optical fibers with assurance that the amount of energy delivered to the surgical site is the proper amount for the intended treatment. Thus reliable reiteration of the beam shifting device is critically important. Unfortunately, there is no device known in the prior art capable of shifting the high power beam of a typical medical laser to a plurality of optical fibers with the required speed and reliability.

SUMMARY OF THE PRESENT INVENTION

The present invention generally comprises an apparatus adapted to steer a laser beam of relatively high power into selected input ends of optical fibers, and selectively to shift the laser beam amount the optical fibers. The apparatus is designed to be reliable and accurate, and to perform the beam shifting task without altering the alignment of the beam with the input ends of the optical fibers.

The present invention includes a connector member having a plurality of parallel passages extending longitudinally therethrough, the passages being disposed in a nominal common plane. The input end of each optical fiber extends through a respective passage, with the axes of the input ends spaced closely together and oriented parallel to the axis of a laser beam directed toward the input ends. A positive lens having a focal plane coincident with the input ends of the optical fibers is interposed between the laser and the optical fiber input ends. An axially translatable shaft extends generally perpendicular to the nominal plane and to the beam axis, and is coupled to drive means to shift the axial position of the shaft selectively, rapidly, and reiteratively. A plurality of transparent, planar refracting panels are secured to the shaft in close axial spacing, the refracting panels being oriented at differing tangential angles with respect to the shaft. The refracting panels are disposed to be translated through the beam axis as the shaft translates to refract the laser beam parallel to the beam axis and offset therefrom sufficiently to direct the beam into an input end of a selected optical fiber.

It should be noted that the refracting panels do not degrade the focus of the laser beam, nor do they alter the beam alignment from axes parallel to the beam axis. Thus the laser beam is shifted only within the common plane of the optical fibers in the connector passages.

BRIEF DESCRIPTION OF THE DRAWING

FIG. 1 is a schematic side elevation of the apparatus for selectively directing and shifting a laser beam among a plurality of optical fibers.

FIG. 2 is a schematic plan view of the apparatus for selectively directing and shifting a laser beam among a plurality of optical fibers.

FIG. 3 is a schematic view of the refraction obtained by the planar refracting members of the present invention.

DESCRIPTION OF THE PREFERRED EMBODIMENT

The present invention is designed for selectively directing a laser beam into a plurality of optical fibers and for selectively shifting the laser beam among the fibers rapidly and reiteratively. With regard to FIGS. 1 and 2, the apparatus of the present invention includes a laser assembly (not shown) which produces a narrow, highly collimated beam 14 directed along a beam axis 15. The apparatus is adapted to steer the beam 14 into any one of a plurality of optical fibers 16, such as the three optical fibers 16a, 16b, and 16c, and to shift the beam selectively into any of the fibers. The medial and distal portions of the optical fibers are encased in a sleeve 17, which may lead, for example, to a catheter for use within a body cavity, incision, or intravascular opening.

The invention provides a connector member 18, comprising a generally cylindrical, tubular member having a bore extending therethrough along an axis generally parallel to the beam axis 15. The proximal end 19 of the connector member is secured rigidly in the opening of a female connector mounting member 6, which is secured in a rigid support 21. The female member 6 includes a longitudinal slot 9, and the connector 18 is provided with a pin 8 which is received in the slot 9 to align the two components precisely. Secured within the bore of the connector member is a bushing 22, the bushing 22 including a plurality of passages extending therethrough parallel to each other and to the axis of the bore. Each of the passages is dimensioned to receive and retain the proximal input end portion of one of the optical fibers 16a–16c. It may be appreciated that the parallel disposition of the passages determines that the proximal ends of the optical fibers are maintained in a nominal common plane, as clearly shown in FIG. 2, and that the nominal common plane is aligned by the engagement of the pin and slot (8–9). The proximal end face 23 of the bushing 22 is provided with a highly reflective surface, such as gold plating, polished brass, or the like. Likewise, the connector member itself and the bushing are formed of copper, brass, silver, or the like materials which dissipate heat rapidly.

Interposed in the laser beam 14 is a positive lens 24 having a focal zone disposed at the proximal input ends of the optical fibers. Due to the fact that the optical fibers are approximately 100 microns in diameter, it may be appreciated that the lens 24 must be a high quality optical lens, and that the lens must be accurately positioned to focus the beam 14 so that the focal point is smaller than the input end of any of the optical fibers.

A salient feature of the invention is the provision of a shaft 26 extending generally transversely to the nominal plane of the proximal ends of the optical fibers and transversely to the beam axis 15. The shaft 26 is supported by bearings or bushings 27 so that the shaft may translate axially, but is maintained in a fixed angular position about the axis of the shaft. One end of the shaft is connected to a device 28 for driving the shaft axially in precise incremental, reciprocal motion, such as a stepper motor, solenoid, linear actuator, or the like.

Joined to the shaft 26 is a plurality of refracting panels 30, 31 and 32. The refracting panels are transparent, planar members with optically flat, parallel faces. The refracting panels 30 and 32 are secured in tangential fashion to the shaft 26 with adhesive or the like. The refracting panel 33 is disposed between the panels 30 and 32 and is joined to the shaft to extend in a plane generally orthogonal to the beam axis and coincident with the axis of the shaft. The panels 30 and 32 are angularly displaced in equal and opposite fashion about the shaft axis with respect to the panel 31.

It is a well established fact in optics that a planar transparent member will not alter a beam passing perpendicularly therethrough. Furthermore, as shown in FIG. 3, a light ray obliquely incident on a planar transparent member will refract the ray so that it exits the transparent member parallel to the incident ray and offset therefrom in the direction of the acute angle of incidence. Due to the fact that the planar members 30-32 are all oriented perpendicular to the nominal plane of the optical fibers in the connector member, the planar members 30-32 all refract the incident laser beam so that it is shifted in the nominal plane in accordance with the respective angular position of the planar member. Thus member 30 is oriented so that the laser beam is refracted and shifted into alignment with the proximal end of optical fiber 16c, as depicted in FIG. 1. Likewise, member 32 is oriented so that the laser beam is refracted and shifted into alignment with the proximal end of optical fiber 16a. Member 31 is a perpendicular to the laser beam, and so provides no refraction to the laser beam in the ideal case. However, for purposes of providing the capability of calibration and alignment of the device by rotation of the shaft, member 31 is necessary to provide whatever slight refractive shifting is required to align the laser beam with the optical fiber 16b. The member 31 also assures that the laser beam travels approximately the same optical path to all of the optical fibers, assuring equalization of the power delivered thereto.

The present invention also includes an electronic system 33 for sensing the axial position of the shaft 26 and actuating the shaft driving device 28 to position the shaft as required to dispose the appropriate planar member 30-32 in intersection with the laser beam to direct the laser beam into the desired optical fiber 16a-16c. Shaft position encoders are well known in the prior art, and may comprise optical encoders, LVDT sensors, or equivalent devices. The shaft may be driven to reciprocate axially and distribute the laser beam to all of the fibers, or may be selectively positioned to deliver the beam to one or two fibers, as required by the medical procedure. Furthermore, the system allows for differing dwell times on the various fibers during reiterative shifting, resulting in transmission of a selectively greater or lesser amount of power to any selected fiber or fibers. It is important to note that the dwell position is not critical for each refracting member, and that shaft position need not be controlled with extreme precision. The position sensor portion of the system 33 may also be interfaced with the laser itself, so that the laser power may be varied selectively in accordance with the shaft position and the fiber 16 receiving the laser beam.

It should be noted that the planar refracting members are disposed in side-by-side, abutting relationship, so that the laser beam cannot pass therebetween and be focused on any portion of the apparatus other than the input ends of the optical fibers. A significant advantage of this arrangement is that the laser beam may be shifted between the fibers without requiring shutting off the laser output. This feature maximizes the delivered power in the shortest possible time. However, should misalignment or other error occur, the provision of a highly reflective surface at the end 23 of the bushing, together with the use of a material that disperses heat, prevents damage during brief laser exposure to the connector structure.

The present invention has been described with reference to medical devices which utilize multiple optical fibers to carry laser beam energy. However, the apparatus described herein may be applied to non-medical uses without departing from the scope and concept of the invention.

We claim:

1. An apparatus for selectively directing a laser beam into a plurality of optical fibers and for selectively shifting the laser beam among the fibres, including; means for supporting input ends of the optical fibers in close proximity, means for directing said laser beam along a beam axis and focusing the laser beam in the area of said input ends of said optical fibers, refracting means interposed between said means for focusing and said input ends of the optical fibers, said refracting means including a plurality of planar, transparent refracting members each disposed at a selected angel with respect to said beam axis to shift said laser beam parallel to said beam axis and into a respective one of said input ends of said optical fibers, and means for translating said refracting members into intersection with said laser beam.

2. The apparatus of claim 1, wherein said means for supporting input ends of the optical fibers includes a connector member having a bore extending therethrough, a bushing received in said bore, and a plurality of passages extending through said bore parallel to the axis of said bore and to each other, said input ends of said optical fibers extending through said passages and maintained thereby in a nominal common plane.

3. The apparatus of claim 2, wherein said means for focusing the laser beam has a focal zone generally coincident with said common plane of said input ends of said optical fibers.

4. The apparatus of claim 3, wherein said means for translating said refracting members includes a shaft extending generally perpendicularly to said beam axis and to said common plane of said input ends of said optical fibers.

5. The apparatus of claim 4, wherein said planar refracting members are secured to said shaft, said refracting members disposed generally perpendicularly to said common plane of said input ends of said optical fibers.

6. The apparatus of claim 5, wherein said planar refracting members are secured to said shaft parallel to the axis thereof and disposed at diverging angles about the axis thereof.

7. The apparatus of claim 4, further including means for translating said shaft axially and maintaining said shaft at a fixed angle with respect to the axis thereof.

8. The apparatus of claim 2, wherein said bushing is formed of a material having high thermal conductivity, and includes an end surface adjacent to said input ends of said optical fibers, said end surface including a highly reflective coating joined thereto.

9. The apparatus of claim 1, wherein said input ends of said optical fibers are disposed in a common plane, and said means for focusing the laser beam has a focal zone generally coincident with said common plane of said input ends of said optical fibers.

10. The apparatus of claim 1, wherein said means for translating said refracting members includes a shaft extending generally perpendicularly to said beam axis and to said common plane of said input ends of said optical fibers.

11. The apparatus of claim 10, wherein said planar refracting members are secured to said shaft, said refracting members disposed generally perpendicularly to said common plane of said input ends of said optical fibers.

12. The apparatus of claim 11, wherein said planar refracting members are secured to said shaft parallel to the axis thereof and disposed at diverging angles about the axis thereof.

13. The apparatus of claim 10, further including means for translating said shaft axially and reciprocally and maintaining said shaft at a fixed angle with respect to the axis thereof.

14. The apparatus of claim 13, further including means for sensing the axial position of said shaft and controlling said means for translating said shaft to dispose any one of said plurality of planar refracting members to intercept said laser beam.

* * * * *